Feb. 29, 1944.    F. R. SIAS    2,343,159
TEMPERATURE COMPENSATION FOR DIRECT CURRENT TELEMETERS
Original Filed Nov. 21, 1942
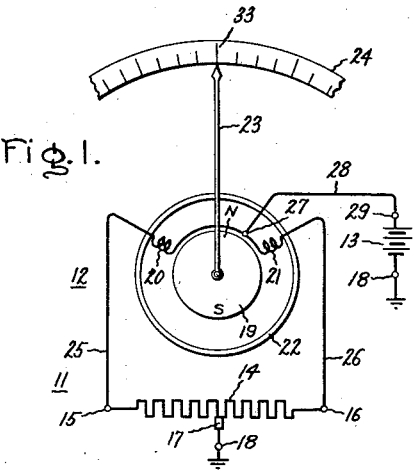
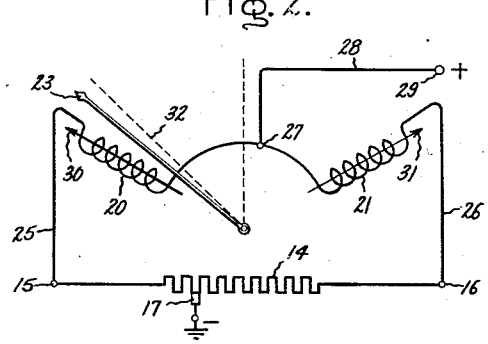
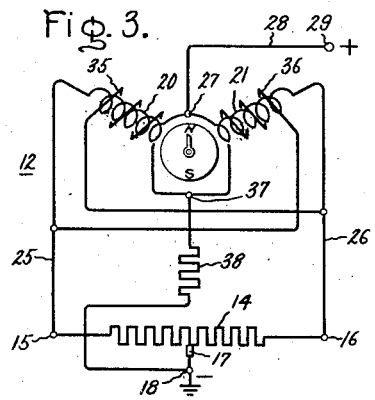
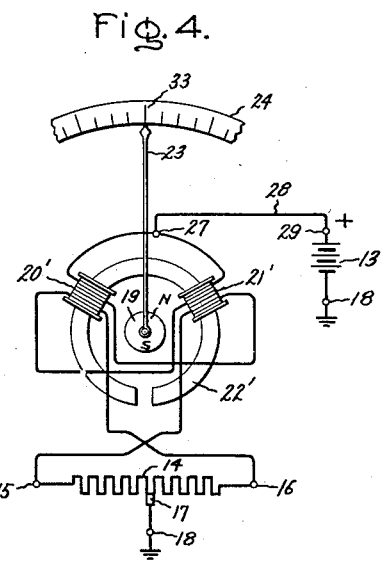
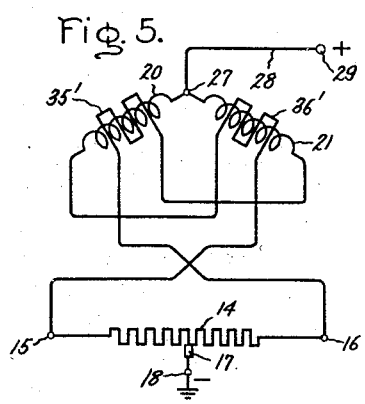
Inventor:
Frederick R. Sias,
by Harry E. Dunham
His Attorney.

UNITED STATES PATENT OFFICE 2,343,159

TEMPERATURE COMPENSATION FOR DIRECT CURRENT TELEMETERS

Frederick R. Sias, Marblehead, Mass., assignor to General Electric Company, a corporation of New York Original application November 21, 1942, Serial No. 466,436. Divided and this application September 1, 1943, Serial No. 500,802

3 Claims. (Cl. 171—95)

My invention relates to telemetering systems and receivers therefor as well as ratio instruments and this application is a division of my application Serial No. 466,436, filed November 21, 1942.

It is an object of my invention to provide arrangements for compensating for the effect of variations in temperature, either ambient temperature or self-heating effects in the receivers of telemetering systems, particularly those employing transmitting units of the variable resistance or potentiometer type, and acting by producing variations in the relative current flow in the two receiver circuits.

Other and further objects and advantages will become due as the description proceeds.

A form of direct current telemetering system now known to those skilled in the art employs what may be called a ratio type receiver in conjunction with a transmitter in the form of a resistor or potentiometer having the end terminals of the resistor connected in series with the two ratio circuits of the receiver and having a sliding brush connected to one terminal of a current source, the other terminal of which is connected to a junction terminal of the two circuits of the receiver. The receiver circuit comprises a pair of coils wound with relatively fine copper wire or other metallic wire having an appreciable positive temperature coefficient of resistance. The potentiometer or transmitter resistor, on the other hand, is ordinarily composed of resistance wire comprising a material such as constantin which has a relatively low or zero temperature coefficient of resistance. In consequence, whenever the transmitter brush is away from the position of balanced currents in the receiver coils, the temperature effects in the two receiver coils are unequal because the circuits contain different proportions of resistance elements having a positive temperature coefficient of resistance and having a substantially zero temperature coefficient of resistance.

The receiver coil in which the greater current flows produces the greater effect on the movable element of the receiver and consequently ordinarily has a predominant effect on the determination of the angular position of the movable element of the receiver. However, this coil is also the one which is more greatly affected by variations in temperature both for the reason that it is more greatly heated electrically or for the reason that its circuit contains a greater proportion of resistance having a positive temperature coefficient of resistance. A rise in temperature therefore has the effect of weakening the receiver coil carrying the greater current. This results in the movable element of the receiver tending to deflect toward the mid position with the rise in temperature and to deflect away from the mid position with a fall in temperature.

My invention has for its object the elimination or minimizing of this effect. In my parent application I have disclosed and claimed a compensating arrangement employing a stationary block of metal which has a negative temperature coefficient of permeability arranged to attract the movable element toward the mid position at relatively low temperatures and with a diminishing effect at higher temperatures, in order to compensate the opposite effect which results from temperature effect on the receiver coils. In this divisional application this result is accomplished electrically.

A better understanding of the invention will be afforded by the following detailed description considered in connection with the accompanying drawing, and those features which are believed to be novel and patentable will be pointed out in the claims appended hereto.

In the drawing, Fig. 1 is an explanatory diagram representing the type of apparatus to which my invention is applicable; Fig. 2 is a schematic and circuit diagram of the arrangement of Fig. 1 explaining the effect of temperature changes and showing the transmitter in one of its extreme end positions; Fig. 3 is a circuit diagram illustrating the arrangement of Fig. 1, modified to electrically provide temperature compensation; Fig. 4 is a schematic diagram illustrating a modified form of receiver with which my invention may also be employed; Fig. 5 represents a modification of the arrangement of Fig. 3 with an electrical temperature compensation system. Like reference characters are utilized throughout the drawing to designate like parts.

In Fig. 1, I have illustrated a telemetering system comprising a transmitter 11 and a receiver 12 with a direct current source of energy which may take the form of a battery 13. The transmitter 11 comprises a potentiometer resistor 14 with end terminals 15 and 16, a movable brush or tap 17 adapted to slide along the resistor 14 in response to variations in an indication or a meter reading to be transmitted to a remote point at which the receiver 12 is located. The brush 17 may be connected directly to one of the terminals, for example, the negative terminal 18 of the current source 13 or, if desired, may be grounded. In the latter case the terminal 18 of the current source 13 is also grounded, and the connection between the brush 17 and the battery terminal 18 takes place through the frame of the ship, vehicle or machine on which the telemetering system is used.

The receiver 12 in the form illustrated in Fig. 1 comprises a pivoted rotatable magnetic element 19 and a stationary member or field structure comprising a pair of angularly displaced electrical coils 20 and 21 with a core structure shown in the form of an annular or hollow cylindrical shield 22. The stator core and shield 22 may be composed of a suitable high permeability low hysteresis magnetic material, such as an alloy composed of approximately 78 per cent nickel and the remainder iron.

The movable magnetic element 19 or rotor may be in the shape of a right circular cylinder pivoted around its cylindrical axis and composed of high coercive force permanent magnet material magnetized along a diameter of the cylinder. Such rotors do not constitute my invention and a suitable form thereof is described in Patent No. 2,248,616, Faus. The rotor 19 may carry a pointer 23 cooperating with a graduated scale 24.

The stator coils 20 and 21 are wound from insulated wire composed of a suitable conducting material such as copper and are mounted as shown at an angle to each other within the shield 22, for example, about 120 degrees apart with their magnetic axes radial, and with the connections such that both coils cause radial magnetic fields of the same polarity to flow toward the center of the circle defined by the shield 22. Accordingly current flowing only in the coil 20 tends to deflect the rotor 19 to the position with its line of magnetization toward the coil 20 and current flowing only in the coil 21 tends to deflect the rotor 19 to the angular position in which its line of magnetization is toward the coil 21. The coils 20 and 21 are connected through conductors 25 and 26, to the end terminals 15 and 16 of the transmitter potentiometer 14. The coils also have a junction terminal 27 connected through a conductor 28 to the remaining terminal, in this case the positive terminal 29 of the current source 13.

Movement of the brush 17 back and forth along the resistor 14 causes fractional rotation of the receiver rotor 19 and therefore deflection of the pointer 23 back and forth along the scale 24. This results from the fact that movement of the brush 17 varies the proportions of resistance of the potentiometer resistor 14 in the circuits of the coils 20 and 21 and therefore varies the relative currents in these coils. When the brush 17 is moved to one extreme position, for example the left-hand end position as illustrated in Fig. 2, the coil 20 is connected directly across the current source 13 and the coil 21 is connected to the current source in series with the resistance of the transmitter 14. Consequently, a strong magnetic field is produced by the coil 20 represented by the heavy arrow 30 and a comparatively weak magnetic field is produced by the coil 21 represented by the light arrow 31. The rotor 19 takes up position with its line of magnetization along the resultant of the magnetic fields, for example along the position in which the pointer 23 is represented.

The coils 20 and 21 are composed of copper or equivalent material which unavoidably has an appreciable temperature coefficient of resistance which is positive. On the other hand, in accordance with the usual practice the transmitter resistor 14 is composed of resistance material such as constantin having a relatively low or zero temperature coefficient of resistance. With the elements in the position shown in Fig. 2, when the ambient temperature rises the resistance of the coil 20 rises appreciably causing the current therein to fall. A proportionate rise in resistance of the coil 21 does not take place, however, for the reason that the circuit of this coil includes the constantin resistor 14. The strength of the magnetic field of the coil 20 therefore weakens in proportion to the strength of the magnetic field of the coil 21 and the movable element of the receiver 12 deflects toward the mid position, for example toward the position with its pointer 23 along the dotted line 32. This variation may be as large as 2½ per cent in the case of an ambient temperature variation of plus or minus 60 degrees from a normal ambient temperature of 10° C. Although I have used the expression "copper wire coils" in the description and claims, it will be understood that my invention is not limited to the use of copper and the expression "copper wire" is intended to include copper and equivalent materials.

For overcoming this temperature error I provide an arrangement which reacts upon the movable magnetic element 19 setting up an attractive force toward the mid scale position 33. The compensating arrangement is such that its effect becomes stronger with fall in temperature and weaker with rise in temperature, thus counteracting the previously described effect of temperature variation on the relative strengths of the coils 20 and 21 which cause the movable element to deflect toward the mid scale position with a rise in temperature. The compensation arrangement in the case of a movable magnetic rotor is one which reacts magnetically with the rotor but may be in the form of either a magnetic element, as in the parent application, or electric elements acting inductively or as electromagnets.

An example of an electrical arrangement for compensating the receiver 12 for temperature variations is illustrated in Fig. 3. The arrangement of Fig. 3 is particularly useful for overcoming self-heating errors of the coils 20 and 21. In this case the coils 20 and 21 are intimately associated thermally with a pair of bucking coils 35 and 36. For example, the coils 20 and 21 may be overwound with the bucking coils 35 and 36. The latter coils are so connected that the currents therein act in opposition to the currents in the coils around which they are wound. Furthermore, the bucking coils 35 and 36 are each connected in circuit with the opposite main coil of the receiver; that is, the bucking coil 35 is in circuit with the main coil 21 and the bucking coil 36 is in circuit with the main coil 20. The coils 35 and 36 may be connected to the coils 20 and 21 in a bridge arrangement. Thus the coils 35 and 36 may have a junction terminal 37 connected in series with a resistor 38 to the transmitter brush 17, so that the coil 36 is in series with the coil 20 between the junction terminals 27 and 37 and the coil 35 is in series with the coil 21 between the junction terminals 27 and 37.

It will be appreciated that serious self-heating error can occur in case the transmitter brush has been in one position for a long period of time and is suddenly shifted to a much different position. For example, if the transmitter brush 17 has been at the left-hand position represented by Fig. 2 the greater current has been flowing through the main receiver coil 20 causing it to be more greatly heated. Then, if the transmitter brush 17 is shifted to the opposite end of the transmitter resistor 14 the greater voltage is applied to the other main receiver coil 21 which is then considerably cooler than the coil 20. Consequently the coil 21 has abnormally low resistance in comparison with the coil 20 and an abnormally high current flows through it in comparison with the coil 20. This causes the pointer 23 to take up a position at first which is too far away from mid scale and then to drift toward the mid scale position. In order to overcome this self-heating error and the pointer drift, the arrangement of Fig. 3 may be provided in which each coil has a bucking element in thermal relation to the opposite coil. Thus the self-heating effect of the coil 20, for example, which would cause it to be too weak, is overcome by the fact that self-heating of the coil 20 results also in heating of the bucking coil 35. The weakening of the bucking coil results in overcoming the self-heating effect of the main coil 20. As the transmitter brush 17 is moved to the right, the relative effects of the bucking coils are varied.

It is not necessary that the coils 35 and 36 be inductive. I have found that still greater compensation of the self-heating error of the main coils 20 and 21 may be accomplished by making the coils 35 and 36 simple resistance units without inductive effect but in thermal relation to the instrument coils such that the coil 20 heats the resistance element 35 and vice versa. The same relationship exists also between the coil 21 and the resistance element 36. The elements 35 and 36 are composed of material which rises in resistance with temperature. Branch circuits are formed. As the coil 20, e. g., is increased in resistance by self-heating so as to draw too little current, the resistance element 36 in the branch circuit also rises in resistance and diverts less current from the coil 20 so as to bring about some compensation of the self-heating error.

While I have described my temperature compensating arrangement in connection with a receiver of the type having coils with radial magnetic axes as illustrated in Fig. 1, it will be understood that my invention is not limited to the use with instruments or receivers of this specific type of construction. It may also be employed with receivers of the type illustrated in Fig. 4 having a broken toroidal core 22' with coils 20' and 21' which link the core 22' and having magnetic axes circumferential with respect to the core 22'. In this case each of the coils 20' and 21' tends to deflect the rotor 19 to the position in which the pointer 23 is away from the coil having the greater current. However, the weakening of either coil by increase of its resistance with rise in temperature tends to cause the pointer 23 to deflect toward mid scale just as in the arrangement in Fig. 1.

The same type of compensation may therefore be employed and windings corresponding to 35 and 36 of Fig. 3, or noninductive elements corresponding to 35' and 36' of Fig. 5 will be assumed to be included in the integral winding structure illustrated in Fig. 4. The inner connections to the winding structure of Fig. 4 represent the connection of such compensating coils or elements, the connection thereof being in accordance with Fig. 5. The telemetering circuit and general receiver construction illustrated in Fig. 4 (but without temperature compensation) is not my invention but is described in connection with Fig. 3 on page 5, lines 29 et seq. of the copending application of Robert G. Ballard, Serial No. 424,779, filed December 29, 1941, and assigned to the same assignee as the present application.

Although in Fig. 3 I have described a specific arrangement for overcoming self-heating errors in which coils are provided in circuit with one main coil and heated in response to heating of the opposite main coil, it will be understood that my invention is not limited to that specific arrangement.

Another arrangement for overcoming self-heating errors is illustrated in Fig. 5. In this case the main coils 20 and 21 are overwound or intimately thermally associated with elements 35' and 36' which are noninductive, or which are so arranged as to have no magnetic effect on the rotor 19. They function simply as resistors subjected to the heating effects of the coils 20 and 21. In the arrangement of Fig. 5 the resistor 35' is connected directly in series with the opposite receiver coil 21 to the transmitter terminal 16. Likewise the resistor 36' is directly connected in series with the opposite receiver coil 20 to the transmitter terminal 15. The resistors 35' and 36' are so proportioned preferably that the total variation in resistance of the resistor is the same for given temperature rise as that of a receiver coil and the heating produced by a given current flow is the same as that of a receiver coil. Thus, the temperature effect is mutual. The flow of current of a given value through the resistor 35' produces a given temperature rise in the receiver coil 20 and vice versa. Although the arrangement of Fig. 5 produces extra heating loss it produces constant and equal total self-heating effects in the coils 20 and 21. As the current in one of the receiver coils falls off tending to reduce its self-heating the current in the accompanying resistor rises proportionately tending to increase the self-heating to the original value. Accordingly self-heating of the coils is compensated in the arrangement of Fig. 5.

I have herein shown and particularly described certain embodiments of my invention and certain methods of operation embraced therein for the purpose of explaining its practice and showing its application, but it will be obvious to those skilled in the art that many modifications and variations are possible and I aim therefore to cover all such modifications and variations as fall within the scope of my invention which are defined in the appended claims.

What I claim as new and desire to secure by Letters Patent of the United States is:

1. A receiver for a direct current telemetering system in which indications are produced by varying the relative proportions of low-temperature coefficient resistance in two circuits, said receiver comprising a pair of copper-wire coils angularly disposed, a movable magnetic element in inductive relation to said coils adapted to deflect in response to variations in ratio of currents in said coils, and a self-heating compensation circuit comprising a pair of bucking coils each mounted with one of said first-mentioned pair of coils but wound to act in opposition thereto and connected in series with the opposite coil of the first pair in a bridge circuit, whereby temperature difference between coils of the first pair due to greater self-heating of one is compensated by opposite temperature difference of the bucking coils.

2. A receiver for a telemetering system in which indications are produced by varying the relative proportions of low-temperature coefficient of resistance in two circuits, said receiver comprising a pair of copper-wire coils angularly disposed, a movable magnetic element in inductive relation to said coils adapted to deflect in response to variations in ratio of currents in said coils, and a self-heating compensation arrangement comprising a pair of elements each in thermal relation to one of said coils but electrically connected in circuit with the opposite one of said coils for holding the electrical heating effect on the circuits of the coils substantially constant without regard to the relative current strength therein.

3. A receiver for a direct current telemetering system in which indications are produced by varying the relative proportions of low temperature coefficient resistance in two circuits, said receiver comprising a pair of copper wire coils angularly disposed, a movable magnetic element in inductive relation to said coils adapted to deflect in response to variations in ratio of currents in said coils and a self-heating compensation circuit comprising a pair of resistance elements each having an appreciable temperature coefficient of resistance and each being mounted with one of said first-mentioned pairs of coils in thermal relation thereto and connected in series with the opposite coil in a bridge circuit whereby temperature differences between the coils due to greater self-heating of one is compensated by opposite temperature difference and variation of resistance in the compensating elements.

FREDERICK R. SIAS.